United States Patent [19]

Borchert et al.

[11] Patent Number: 4,551,247
[45] Date of Patent: Nov. 5, 1985

[54] DEVICE FOR SEPARATING SOLID PARTICLES OF DIRT FROM COOLING WATER FOR POWER STATIONS

[76] Inventors: Werner Borchert, In den Blamüsen, 42, D-4000 Düsseldorf; Klaus D. Nitsch, Dietrichstr. 26, D-4130 Moers, both of Fed. Rep. of Germany

[21] Appl. No.: 579,904
[22] PCT Filed: Apr. 26, 1983
[86] PCT No.: PCT/EP83/00099
  § 371 Date: Dec. 21, 1983
  § 102(e) Date: Dec. 21, 1983
[87] PCT Pub. No.: WO83/03780
  PCT Pub. Date: Nov. 10, 1983

[30] Foreign Application Priority Data

Apr. 26, 1982 [EP] European Pat. Off. ........ 82200496.6

[51] Int. Cl.⁴ ............................................. B01D 35/24
[52] U.S. Cl. ................................... 210/304; 210/307; 210/313; 210/422; 210/512.1
[58] Field of Search ................ 210/175, 181, 304, 305, 210/307, 308, 309, 312, 313, 320, 418, 420, 422, 433.1, 435, 437, 456, 457, 497.01, 512.1, 521; 209/262, 273

[56] References Cited

U.S. PATENT DOCUMENTS

| 1,571,736 | 2/1926 | Reed et al. | 209/273 |
| 2,226,045 | 12/1940 | Baldwin | 210/422 |
| 2,902,156 | 9/1959 | Dahlberg | 210/418 |
| 2,913,114 | 11/1959 | Plaven | 209/273 |
| 2,998,137 | 8/1961 | Vane | 209/211 |
| 3,067,876 | 12/1962 | Hruby, Jr. | 210/788 |
| 3,088,595 | 5/1963 | Robb | 210/304 |
| 3,771,290 | 11/1973 | Stethem | 210/304 |
| 3,985,522 | 10/1976 | Kuhlmann | 210/512.1 |
| 4,017,390 | 4/1977 | Vicard | 210/788 |
| 4,199,443 | 4/1980 | Tauber | 210/304 |
| 4,276,171 | 6/1981 | Jackson | 210/456 |
| 4,287,055 | 9/1981 | Holz | 209/273 |
| 4,318,805 | 3/1982 | LeBlanc | 209/273 |
| 4,366,056 | 12/1982 | Jackson | 210/435 |

FOREIGN PATENT DOCUMENTS 2708135 8/1978 Fed. Rep. of Germany .

Primary Examiner—Richard V. Fisher
Assistant Examiner—Wanda L. Millard
Attorney, Agent, or Firm—Karl F. Ross; Herbert Dubno

[57] ABSTRACT

For a device for separating solid particles of dirt from cooling water for power stations and the like, a screening drum (2) is disposed in a cylindrical housing (1) so as to form an annular chamber (3). An axially fitted dome (5) is provided with a tangential inflow spigot (6) so that the incoming cooling water flows helically into the interior of the drum (2). An outflow spigot (4) is secured tangentially in the housing (1), a baffle (10) being disposed in the annular chamber (3) in front of the outflow spigot orifice (9). Baffle (10) bears by one edge (11) coaxially against the outer surface of the drum (2), and extends over part of the periphery of the latter, the distance from said drum increasing in the direction of flow. The baffle (10) ensures uniform pressure distribution between the interior of the drum (2) and the annular chamber (3) over the entire periphery. To flush out the accumulated particles of dirt, a discharge spigot (8) is connected to the interior of the drum (2) and is opened for a short period at specific intervals by means of a valve.

5 Claims, 4 Drawing Figures

DEVICE FOR SEPARATING SOLID PARTICLES OF DIRT FROM COOLING WATER FOR POWER STATIONS

This invention relates to a device for separating solid particles of dirt from cooling water for power stations and the like, consisting of a screening drum disposed statically in a cylindrical casing so as to form an annular chamber, for axial introduction of the helically incoming cooling water, a cooling water outlet spigot secured tangentially to the cylindrical housing, and a dirt particle discharge spigot connected to the interior of the drum and provided with a valve.

Large quantities of cooling water are required to cool heat exchangers in steam power plants or other power stations, and solid particles, such as pieces of wood, plastics, leaves, grass, mussels, etc. have to be removed in order to avoid any damage and clogging of the power station components. While coarse particles of dirt of this kind can be retained by means of rakes, the devices used for separating smaller particles are of the type in which the cooling water flows through a screening drum secured in a cylindrical casing.

In a known construction of this kind the cooling water is helically accelerated and introduced axially into the screening drum by turbulence means, e.g. valves or an ante-chamber to which the flow is introduced tangentially. While the particles of dirt are retained in the screening drum, the cooling water flows outwardly through the drum into an annular chamber, from which it flows out via a tangential outflow spigot. The particles of dirt accumulating in the drum are flushed out at certain intervals, a discharge spigot connected to the drum interior being opened for a brief period by a valve. For a separator device of this kind to operate satisfactorily, the cooling water must approach the inner surface of the screening drum at an acute angle so that the particles of dirt are washed into the central sink from the surface by the tangential forces, and the screen perforations must not clog. In practice, however, it is a disadvantage that particles of dirt cover or clog the screening drum in the region of the outflow orifice to a greater extent than in the other peripheral zones. This partial clogging or covering of the screening surface not only results in a considerable reduction in performance, but also necessitates more frequent washing out of the drum.

In contrast, the object of the invention is so to construct the device as to greatly improve performance and prevent any deposition of or clogging by particles of dirt in the region of the outflow orifice.

To this end, according to the invention, a baffle is disposed in the annular chamber in front of the cooling water outflow orifice, said baffle bearing coaxially by one edge against the outer surface of the drum and extending over a part of the periphery of the drum with an increasing distance from said drum as considered in the direction of flow.

The basic advantage of providing the baffle in the annular chamber is that the pressure difference between the outflow orifice and the drum interior is distributed uniformly over the entire periphery of the drum and no longer acts preferentially on the drum surface situated opposite the outflow orifice. The result is a uniform rotary flow, thus preventing direct outflow of the cooling water through the drum into the outflow orifice.

The baffle construction and arrangement may vary according to operating and flow conditions, and it may extend over approximately one-third to two-thirds of the drum periphery; preferably, it extends over approximately half the drum periphery. To obtain particularly favorable flow conditions and high efficiency, the angle between the baffle and the outer surface of the drum is advantageously approximately equivalent to the angle of approach of the cooling water to the inner surface of the drum.

The favorable distribution of the pressure can be further optimized by disposing the drum eccentrically in the cylindrical housing, the minimum radial distance between the two parts being on that side where the free edge of the baffle is situated.

One exemplified embodiment of the invention is illustrated in the drawing wherein.

Figure 1:
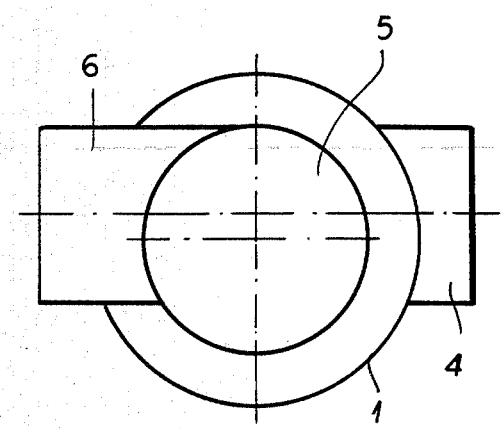
FIG. 1 is a plan view of a device for separating solid particles of dirt from cooling water.
Figure 2:
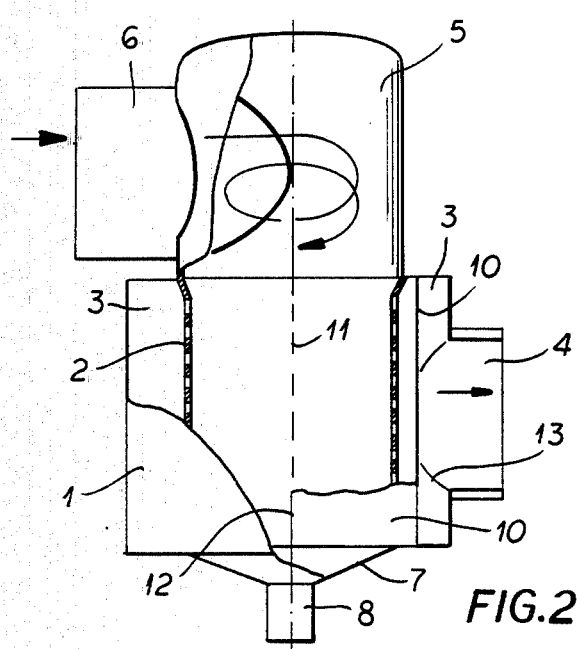
FIG. 2 is a side elevation and partial section of FIG. 1.
Figure 3:
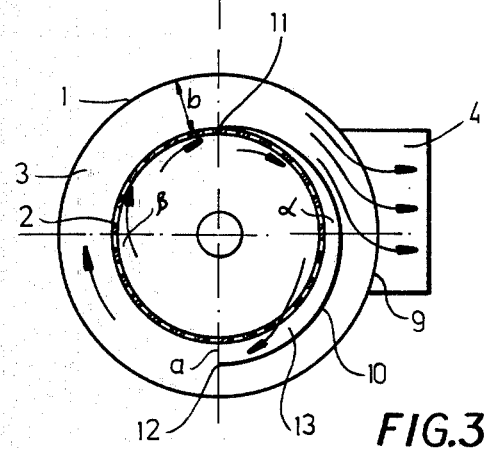
FIG. 3 is a central cross-section of FIG. 2 in the region of the drum and the outflow spigot and FIG. 4 is a block schematic diagram of a cooling water plant provided with the device shown in FIGS. 1 to 3.

The exemplified embodiment of a device for separating solid dirt particles from cooling water as illustrated in FIGS. 1 to 3 consists essentially of a cylindrical housng 1 in which a screening drum 2 is so disposed axially as to form an annular chamber 3 between the two parts. The drum may, for example, be 40% perforate. An outlet spigot 4 is connected to the cylindrical housing so as to be laterally offset from the center-line and allow tangential outflow. A cylindrical dome 5 is fitted to the inlet end of the drum 1 and has a tangential inflow spigot 6. In the embodiment illustrated in the drawing, the cooling water flows through the inlet 6 into the dome 5, where it experiences a helical rotary movement so that it flows helically into the interior of the drum 2. A discharge spigot 8 is provided at the base 7 of the housing 1 and is provided with a valve 15, which will be explained in detail hereinafter.

According to the invention, a semi-circular baffle 10 is provided in front of the outlet orifice 9 of the outlet spigot 4 and bears by one edge 11 against the outer surface of the drum 2 while the edge 12 is increasingly spaced from the drum as considered in the direction of flow. The resulting gap between the drum 2 and the baffle 10 is sickle-shaped in plan view. The angle $\alpha$ between the baffle 10 and the drum 2 should preferably correspond to the angle of approach $\beta$ of the cooling water as it flows against the inner surface of the drum 2. In the exemplified embodiment, the baffle 10 is of semi-circular cross-section and extends over half the periphery of the drum 2. The free edge 12, which is situated in the direction of flow, is spaced by the amount a from the drum 2, this distance preferably being equal to half the space b between the drum 2 and the housing 1.

In modification of the construction illustrated, baffle 10 may also cover a smaller or larger area of the drum 2. The important factor is simply that the baffle 10 screens the drum 2 from the outlet orifice 9 and has the favourable flow properties referred to.

The cooling water containing the dirt particles flows, during normal operation, through the inflow spigot 6 into the dome 5, where it is brought into a rotary movement, and flows helically into the drum 2 axially. Here it flows against the inner surface of the drum 2 at the angle β. While the water is flowing through the drum 2, particles of dirt are retained and, as a result of the rotary flow they flow from the inner surface into the axial sink. As a result of the baffle 10, the lower pressure at the outlet orifice 9 cannot directly affect the opposite surface of the drum. On the contrary, in this zone the cooling water enters the gap 13, which is sickle-shaped in plan view.

In order to empty the interior of the drum 2 containing the particles of dirt, the valve 15 associated with outlet spigot 8 (see also FIG. 4) is opened and a short flushing operation is carried out. The normal separation process is resumed after the valve 15 has been closed.

Figure 4:
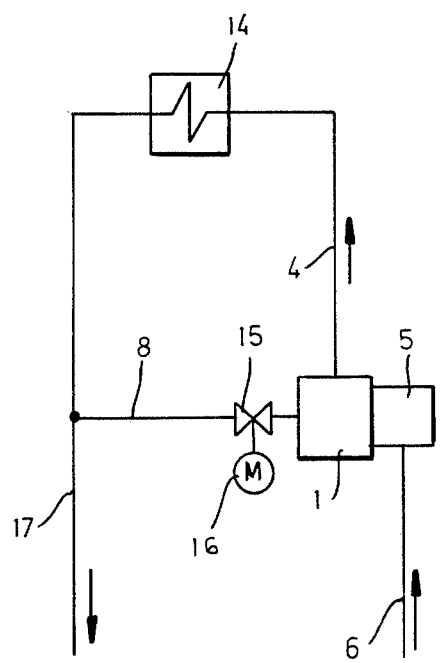

FIG. 4 is a block schematic of a cooling water plate showing that the cooling water leaving the outlet spigot 4 is taken through a heat exchanger 14 of a thermal power station or the like. The outflow line is denoted by reference 17. The valve 15 associated with the outlet spigot 8 is controlled by a servomotor 16, which is controlled, for example, by a differential pressure measurement between inlet spigot 6 and outlet spigot 4. By means of valve 15, the water used to flush out the dirt particles can be fed directly to the discharge line 17 so as to bypass the heat exchanger 14.

Unlike the exemplified embodiment shown in FIGS. 1 to 3, the baffle may alternatively extend over just one-third or two-thirds of the periphery of the drum. The distance a would then be adjusted accordingly. Depending upon the size and position of the device, the discharge spigot 8 may be disposed laterally on the housing 1 and be connected tangentially to the drum 2.

We claim:

1. In a device for separating solid particles of dirt from the cooling water for steam power plants or other power stations, which device includes a screening drum having opposite ends and disposed statically in a cylindrical casing so as to form an annular chamber therebetween, a cooling water inlet spigot communicating with the interior of said screening drum at one of its ends and generally tangentially thereof for introduction of unfiltered incoming cooling water axially into said screening drum and so as to flow generally helically within said screening drum prior to being filtered and codirectionally generally helically within said annular chamber subsequent to being filtered, a cooling water outlet spigot communicating with said annular chamber generally tangentially of said cylindrical casing, and a dirt particle discharge spigot communicating with the interior of said screening drum at the other end thereof and provided with a valve;

the improvement comprising that a baffle is disposed in said annular chamber intermediate said cooling water outlet spigot and the portion of the outer periphery of said screening drum proximate thereto, said baffle extending generally circumferentially of said screening drum over a portion of the outer periphery of the same and having two circumferentially spaced edges, said baffle at one of said edges bearing coaxially against the outer surface of said screening drum and at the other of said edges being spaced from said surface, and the spacing between said baffle and said outer surface of said screening drum increasing as viewed in the direction of helical flow of the cooling water.

2. In a device according to claim 1, the improvement further comprising that said baffle extends over about one-third to two-thirds of the outer periphery of said screening drum.

3. In a device according to claim 2, the improvement further comprising that said baffle extends over approximately half the outer periphery of said screening drum.

4. In a device according to claim 1, the improvement further comprising means orienting said baffle to include between the same and said outer surface of said screening drum an angle α, that said cooling water inlet spigot is disposed to cause the unfiltered cooling water to approach the inner surface of said screening drum at an angle β, and that said angles are approximately equal to each other.

5. In a device according to claim 1, the improvement further comprising means disposing said screening drum eccentrically in said cylindrical casing, the arrangement being such that the location of the parts of said drum and casing which are closest to each other is where said other edge of said baffle is situated.

* * * * *